3,058,859
LAMINATING PROCESS
Lyle O. Amberg, Landenberg, Pa., assignor to Hercules Powder Company, Wilmington, Del., a corporation of Delaware
No Drawing. Filed Dec. 2, 1959, Ser. No. 856,670
14 Claims. (Cl. 154—43)

The present invention relates to the art of laminating diverse rubbery materials. More specifically, the invention relates to a process of indirectly bonding a rubbery copolymer of ethylene and propylene to a previously vulcanized natural or synthetic rubber while simultaneously cross-linking the copolymer; and further relates to the laminate produced by the process.

Recent improvements in the art of polymerization have enabled the production of solid, amorphous copolymers of ethylene and propylene that have many of the physical characteristics of the commonly used rubbers and offer promise as improved replacements for the older types of rubber in many applications. One such application is the use of the copolymers in making tires and in the retreading of worn tires where advantage is taken of the excellent wear characteristics of the copolymers. The use of the copolymers in retreading tires has, however, met with considerable difficulty because it is not possible to secure by normal retreading practice a satisfactory bond between the copolymers and the sulfur-vulcanized rubber of which the vast majority of tires are made. The reason for this failure to achieve a strong bond is not known but is possibly due to the fact that the copolymers must be cross-linked, i.e., vulcanized, by vulcanizing systems that are quite different from the sulfur-based systems employed in the vulcanization of the common tire rubbers. In any event there is needed a method by which the rubbery copolymers of ethylene and propylene can be bonded directly or indirectly to a sulfur-vulcanized rubber while simultaneously being cross-linked.

The present invention resides in the discovery that a partially brominated isoolefin-polyolefin interpolymer when used as an interlayer in the lamination and simultaneous cross-linking of copolymers of ethylene and propylene with a sulfur-vulcanized rubber provides an exceedingly strong bond which is unaffected by normal stretching and flexing.

The process of the invention comprises making a laminated structure comprising a plurality of layers of different rubbery materials strongly bonded to each other which comprises forming an assembly of layers in the order named of (1) a sulfur-vulcanized rubber selected from the group consisting of natural rubber and synthetic rubbery polymers of at least one compound selected from the group consisting of conjugated diolefins and chloroprene, (2) a rubbery, partially brominated isoolefin-polyolefin interpolymer admixed with at least one agent capable of effecting its vulcanization and (3) a rubbery copolymer of ethylene and propylene admixed with at least one agent capable of effecting its cross-linking, and subjecting the assembly to heat and pressure to effect lamination of the layers, vulcanization of said partially brominated interpolymer and cross-liking of said copolymer of ethylene and propylene whereby the individual layers of the assembly become strongly bonded to each other. The invention is further directed to the laminate so produced.

In practice, the brominated interpolymer can be applied to the surface of the copolymer and rubber, to be laminated, in the form of a cement made up as a solution in an appropriate solvent or a sheet of the brominated interpolymer can be placed between the layers of copolymer and rubber or both a cement and a sheet may be used.

Before describing the invention in greater detail, the following examples are presented for purpose of illustration, parts and percentages being by weight unless otherwise specified. The molecular weight of the polymers employed in the examples is shown by the reduced specific viscosity (RSV) given therein. By the term "reduced specific viscosity" is meant the specific viscosity, corrected to zero shear gradient, divided by the concentration of the solution in grams per 100 milliliters, measured at 135° C., on a solution in decahydronaphthalene containing 0.1 gram of the polymer in 100 milliliters of the solution.

EXAMPLE 1

In this example, a conventional sulfur-cured SBR (butadiene-styrene rubber) tire was retreaded with a copolymer of ethylene and propylene by means of an interlayer of a brominated interpolymer of isobutylene and isoprene. Two types of brominated interpolymer stock were used, a white stock in which zinc oxide served as vulcanizing agent and a black stock in which the vulcanizing agent was a combination of sulfur and zinc oxide. Both stocks were prepared by milling the partially brominated interpolymer with other ingredients on a conventional rubber mill. The formulas of these two stocks were as follows:

(1) *Zinc Oxide-Containing White Stock*

| | Parts |
|---|---|
| Partially brominated isobutylene-isoprene interpolymer (97% isobutylene, 3% isoprene and brominated to contain 3% bromine) | 100 |
| Hydrated silica pigment | 45 |
| Titanium coloring pigment | 20 |
| Zinc oxide | 5 |
| Hydrogenated fish oil acids | 1.0 |
| Antioxidant (polymerized trimethyl dihydroquinoline | 1.0 |
| Processing oil | 5.0 |
| Benzothiazyl disulfide-$(C_6H_4NCS)_2S_2$ | 0.1 |
| Di-o-tolylguanidine | 2.0 |

(2) *Sulfur-Containing Black Stock*

| | Parts |
|---|---|
| Partially brominated isobutylene-isoprene interpolymer (97% isobutylene, 3% isoprene and brominated to contain 3% bromine) | 100 |
| Fast extruded furnace (FEF) black | 20 |
| Easy processing channel (EPC) black | 20 |
| Tackifier (phenolic resin) | 10 |
| Antioxidant (phenyl-$\beta$-naphthylamine) | 1.0 |
| Processing oil | 10 |
| Hydrogenated fish oil acids | 1.0 |
| Sufur | 2.0 |
| Di-o-tolylguanidine | 1.0 |
| Zinc oxide | 5.0 |

The ethylene-propylene copolymer was also admixed with other ingredients as follows:

| | Parts |
|---|---|
| Ethylene-propylene copolymer (32 mol percent propylene, RSV=3.5) | 100 |
| High abrasion furnace (HAF) black | 50 |
| Bis($\alpha,\alpha$-dimethylbenzyl) peroxide | 4.0 |
| Sulfur | 1.0 |

The sulfur-containing interpolymer black stock was made into a cement comprising a 15% solution in heptane. The SBR tire was buffed to remove the remains of the old tread and spread with a thin layer of the cement which was allowed to dry about 4 hours to form a tacky coating. A thin (50 mil) layer of the interpolymer white stock was placed around the coated tire, and an ethylenepropylene copolymer layer (⅜ inch) was superimposed on it thereby forming a 3-ply assembly. By compression molding the assembly at a pressure of 125 p.s.i.g. and a temperature of 155° C. for 45 minutes, the copolymer was laminated circumferentially to the tire, while the partially brominated interpolymer was vulcanized and the ethylene-propylene copolymer cross-linked. The resulting laminate was removed from the hot mold and cooled. An excellent bond between the layers had been formed. The bond strength of the weakest lamination was 65 lb./in. at room temperature. The force required to start delamination when there was a cut down the center of the brominated interpolymer was 110 lb./in. at room temperature. A bond strength of this magnitude is considered a very tight lamination and quite adequate for a retreaded tire.

EXAMPLE 1A

The procedure of Example 1 was followed except that the ethylene-propylene copolymer was laminated directly to the SBR tire without any intermediate brominated interpolymer. It was found that the copolymer tread adhered very poorly to the tire, a force of only about 2 lb./in. being required to delaminate the layers at room temperature. In fact, the two layers usually separated when the hot mold was opened.

This example clearly shows the necessity for using an intermediate layer of brominated interpolymer.

EAMPLE 1B

The procedure of Example 1 was followed except that the ethylene-propylene copolymer was laminated to the SBR tire through a 50 mil layer of a nonbrominated isobutylene-isoprene interpolymer (97% isobutylene and 3% isoprene) admixed with sulfur, accelerators and carbon black. It was found that upon flexing delamination occurred at the juncture of the interpolymer layer with the tire.

This example demonstrates the necessity for using a brominated interpolymer.

EXAMPLE 2

In this example a tire tread of the copolymer of ethylene and propylene described in Example 1 was bonded to a conventional sulfur-cured SBR tire with a brominated interpolymer cement of isobutylene and isoprene. The zinc oxide-containing interpolymer white stock described in Example 1 was made into a cement comprising a 10% solution in heptane. The tire was buffed and spread with a thin layer of this cement. The inner face of the copolymer tread was also spread with a thin layer of the cement. When the cements were dry but still tacky, the copolymer tread was cross-linked and laminated circumferentially over the tire while simultaneously vulcanizing the brominated interpolymer by compression molding as described in Example 1. The resulting bond was comparable to that obtained in Example 1 and quite adequate for a retreaded tire.

EXAMPLE 2A

The procedure of Example 2 was followed with the single exception that the ethylene-propylene copolymer was bonded to a sulfur-cured natural rubber tire with the white stock cement. An equally good bond was obtained.

EXAMPLE 2B

The procedure of Example 2 was followed with the single exception that the ethylene-propylene copolymer was bonded to a sulfur-cured tire composed of a mixture of natural rubber and butadiene-styrene rubber using the interpolymer white stock cement. An equally good bond was obtained.

EXAMPLE 2C

The procedure of Example 2 was followed with the single exception that the ethylene-propylene copolymer was bonded to a sulfur-cured butyl rubber tire using the interpolymer white stock cement. An equally good bond was obtained.

EXAMPLE 3

In this example a tire tread of the copolymer of ethylene and propylene described in Example 1 was bonded to a conventional sulfur-cured SBR tire employing an interlayer of the zinc oxide-containing interpolymer white stock described in Example 1. The ethylene-propylene copolymer layer (⅜ inch), a 50 mil layer of the white stock and the tire were preassembled and then by compression molding as described in Example 1, the copolymer was laminated circumferentially to the tire, while the partially brominated interpolymer was vulcanized and the ethylene-propylene copolymer crosslinked. A strong bond was formed, the strength of the weakest lamination being 60 lb./in. at room temperature.

As has been demonstrated in the examples a copolymer of ethylene and propylene can be laminated with a previously vulcanized natural or synthetic rubber by employing an intermediate layer of a partially brominated isoolefin-polyolefin interpolymer while simultaneously cross-linking the copolymer and vulcanizing the interpolymer.

The copolymers of ethylene and propylene useful in the invention are materials known to the art which can be prepared by copolymerizing ethylene with propylene by any of several methods, such as the methods described in Belgian Patents 535,082, 538,782 and 553,655 and U.S. Patents 2,700,663 and 2,726,231. The copolymers can contain from about 20 to 70 mole percent of propylene. If the copolymers contain more than about 70 mole percent propylene, degradation normally results when they are heated in the presence of practical amounts of cross-linking agents and carbon black. Those copolymers which contain less than about 20 mole percent propylene are not rubbery. The copolymers can also contain a small amount of one or more additional unsaturated compounds that are copolymerizable with ethylene and propylene but do not alter their basic properties. Any agent capable of cross-linking the above copolymers can be used in the process. Such agents in general are compounds capable of liberating free radicals and are typified by organic peroxides. A preferred class of peroxides are those of the following general formula:

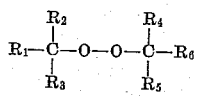

where $R_1$ and $R_6$ are aryl and $R_2$, $R_3$, $R_4$ and $R_5$ are hydrogen or alkyl groups of less than 4 carbon atoms. Examples of these peroxides are dibenzyl peroxide, bis (α,α-dimethylbenzyl) peroxide, bis(α,αdiisopropylnaphthylmethyl) peroxide, benzyl(α-methylbenzyl) peroxide, benzyl(α,α-dimethylbenzyl) peroxide, etc. Other peroxides that can be used include, for example, t-butyl (pentamethylethyl) peroxide, di(triethylmethyl) peroxide, benzoyl peroxide, t-butyl perbenzoate, ethyl percamphorate, di-t-butyl peroxide, benzoperacid, t-butyl hydroperoxide, p-menthyl(α,α-dimethylbenzyl) peroxide and pinanyl(α,α-dimethylbenzyl) peroxide. In addition to peroxide vulcanizing agents, other auxiliary agents can be employed including sulfur, red lead, quinone dioxime, etc. The optimum ratio of cross-linking agent to copolymer is readily determined for any composition. In general, from about 0.1 to 20% by weight based on the weight of copolymer of peroxide is employed in the practice of the invention.

The rubbers which are useful in the practice of the invention include sulfur-vulcanized natural rubber and those sulfur-vulcanized synthetic rubbers which are synthetic, rubbery polymers of at least one compound selected from the group consisting of conjugated diolefins and chloroprene and mixtures thereof. The synthetic, rubbery polymers include, for instance, polymerization products of butadiene and its derivatives and homologs, e.g., methylbutadiene, dimethylbutadiene, isoprene, pentadiene and chloroprene. The definition also includes rubbery copolymers of the conjugated diolefins with other unsaturated organic compounds, such as styrene, acrylonitrile, isobutylene, etc. Synthetic rubber resulting from the copolymerization of butadiene and styrene is the one encountered most frequently.

It should be noted that in order to obtain a strong bond care must be taken to make sure that the surface of the vulcanized rubber, to be laminated, is clean. For example, allowing the rubber to become so hot while it is being buffed that it thermally softens will weaken the lamination and may cause failure of the bond.

The partially brominated rubbery isoolefin-polyolefin interpolymers useful in this invention are well known in the art and include the brominated interpolymers of a major proportion, desirably from 70 to 99% by weight of an isoolefin, with a minor proportion, desirably from 1 to 30% by weight, of a polyolefin. The isoolefin generally contains from 4 to 8 carbon atoms such as isobutylene, 3-methyl butene-1, 4-methyl pentene-1, etc. The polyolefin generally contains from 4 to 18 carbon atoms and can be, for example, butadiene-1,3, isoprene, 2,4-dimethyl butadiene-1,3, dimethallyl, 2-methyl hexadiene-1,5, cyclohexadiene, 1-vinyl cyclobutene-2, dipentene, 2,6-dimethyl-4-methylene-heptadiene-2,5, myrcene, ocimene, fulvene, 6,6-diphenyl fulvene, 1,3,3-trimethyl-6-vinyl-cyclohexadiene-2,4,6,6-vinyl methyl fulvene, etc. One or more isoolefins may be interpolymerized with one or more polyolefins. The rubbery interpolymers of isobutylene with small amounts of isoprene or butadiene are preferred.

Bromination of the interpolymer is carried out by known methods and is terminated prior to complete saturation. Typical brominated interpolymers contain from about 0.5 to 5% bromine by weight.

The partially brominated interpolymers may be vulcanized by the same general methods as the non-brominated interpolymers, as for example with sulfur. In addition the partially brominated interpolymers may be vulcanized in the absence of sulfur with agents, such as the bivalent metal oxides particularly zinc oxide, which are ineffective in vulcanizing the parent non-brominated interpolymers. Any vulcanizing agent or agents for the partially brominated interpolymer can be employed in the practice of the invention.

As demonstrated in the examples, the partially brominated interpolymer can be employed as a cement, a sheet or combination cement and sheet; however, a cement or combination of cement and sheet is preferred when laminating a rough surface. The cement is a solution or dispersion in an appropriate inert liquid organic solvent or diluent such as a hydrocarbon or halogenated derivative thereof; examples of which are gasoline, toluene, chlorobenzene, hexane, heptane, trichloroethane, carbon tetrachloride, etc. Characteristically, such cements form a tacky coating when allowed to dry for several hours and thus, when used, they serve to temporarily hold the assembly together while it is being handled prior to laminating.

Lamination, according to the invention, is achieved simply by heating under pressure a three-ply assembly of the copolymer and rubber with a layer of the partially brominated interpolymer therebetween to a temperature at which vulcanization of the interpolymer and the copolymer takes place; generally this will require a minimum temperature of about 130° C. with the maximum temperature being limited only by the decomposition of materials being laminated. Pressure is used to maintain intimate contact between the materials during lamination, and to prevent porosity from gaseous products of decomposition associated with vulcanization in accordance with standard retreading practice.

Both the copolymer and the brominated interpolymer normally will contain one or more additives such as fillers, plasticizers, pigments, antioxidants, etc., as is evident from the examples. Such additives, however, are immaterial as far as obtaining bonding in the practice of the invention is concerned. Normally, however, they are desirable for one or more obvious reasons. Fillers, for instance, serve to reinforce the copolymer and the interpolymer and thus, produce a stronger product with better wear properties.

What I claim and desire to protect by Letters Patent is:

1. A laminate comprising strongly bonded layers in the order named of (1) a sulfur-vulcanized rubber selected from the group consisting of natural rubber and synthetic, rubbery polymers of at least one compound selected from the group consisting of conjugated diolefins and chloroprene, (2) a vulcanized, rubbery, partially brominated isoolefin-polyolefin interpolymer and (3) a cross-linked rubbery copolymer of ethylene and propylene.

2. The composition of claim 1 wherein the rubber comprises sulfur-vulcanized natural rubber.

3. The composition of claim 1 wherein the rubber comprises a sulfur-vulcanized rubbery copolymer of butadiene and styrene.

4. The composition of claim 1 wherein the partially brominated isoolefin-polyolefin interpolymer comprises a vulcanized olefinically-unsaturated interpolymer of about 70 to 99 percent by weight of isobutylene and about 1 to 30 percent by weight of an aliphatic conjugated diolefin and containing a combined bromine content above 0.5 percent by weight but below that which corresponds to complete saturation of the olefinic bonds.

5. A process of making a laminated structure comprising a plurality of layers of different rubbery materials strongly bonded to each other which comprises forming an assembly comprising layers in the order named of (1) a sulfur-vulcanized rubber selected from the group consisting of natural rubber and synthetic, rubbery polymers of at least one compound selected from the group consisting of conjugated diolefins and chloroprene, (2) a rubbery, partially brominated isoolefin-polyolefin interpolymer admixed with at least one agent capable of effecting its vulcanization and (3) a rubbery copolymer of ethylene and propylene admixed with at least one agent capable of effecting its cross-linking and subjecting the assembly to heat and pressure to effect lamination of the layers, vulcanization of said partially brominated interpolymer and cross-linking of said copolymer of ethylene and propylene whereby the individual layers of said assembly become strongly bonded to each other.

6. The process of claim 5 wherein the partially brominated interpolymer layer is a cement comprising a solution of the interpolymer in an organic solvent.

7. The process of claim 5 wherein the partially brominated interpolymer layer is in the form of a sheet.

8. The process of claim 5 wherein the partially brominated interpolymer layer comprises a cement comprising a solution of the interpolymer in an organic solvent in addition to a sheet of said interpolymer.

9. The process of claim 5 wherein the vulcanized rubbery composition comprises sulfur-vulcanized natural rubber.

10. The process of claim 5 wherein the vulcanized rubbery composition comprises a sulfur-vulcanized rubbery copolymer of butadiene and styrene.

11. The process of claim 5 wherein the partially brominated isoolefin-polyolefin interpolymer comprises an olefinically-unsaturated interpolymer of about 70 to 99 percent by weight of isobutylene and about 1 to 30 percent by weight of an aliphatic conjugated diolefin and containing a combined bromine content above 0.5 percent by weight but below that which corresponds to complete saturation of the olefinic bonds.

12. The process of claim 5 wherein the copolymer of ethylene and propylene is admixed with a minor amount of an organic peroxide cross-linking agent, and a minor amount of sulfur.

13. The process of claim 5 wherein the copolymer of ethylene and propylene is admixed with a minor amount of a di(aralkyl) peroxide cross-linking agent having the formula:

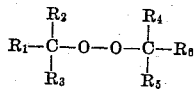

where $R_1$ and $R_6$ are aryl groups and $R_2$, $R_3$, $R_4$ and $R_5$ are selected from the group consisting of hydrogen and alkyl groups of less than 4 carbon atoms, and a minor amount of sulfur.

14. The process of claim 5 wherein the copolymer of ethylene and propylene is admixed with a minor amount of bis($\alpha,\alpha$-dimethylbenzyl) peroxide.

References Cited in the file of this patent

UNITED STATES PATENTS

| | | |
|---|---|---|
| 2,631,984 | Crawford | Mar. 17, 1953 |
| 2,668,789 | Phreaner | Feb. 9, 1954 |
| 2,826,570 | Ivett | Mar. 11, 1958 |
| 2,955,103 | Baldwin et al. | Oct. 4, 1960 |
| 2,983,714 | Robinson et al. | May 9, 1961 |
| 2,992,962 | Borland et al. | July 18, 1961 |